US012171052B2

(12) United States Patent
Ha et al.

(10) Patent No.: US 12,171,052 B2

(45) Date of Patent: Dec. 17, 2024

(54) OVEN HAVING MULTIPLE CHOKES

(71) Applicant: LG Electronics Inc., Seoul (KR)

(72) Inventors: Junghyeong Ha, Seoul (KR); Sunghun Sim, Seoul (KR); Yunbyung Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 861 days.

(21) Appl. No.: 17/061,150

(22) Filed: Oct. 1, 2020

(65) Prior Publication Data

US 2021/0352781 A1 Nov. 11, 2021

(30) Foreign Application Priority Data

May 11, 2020 (KR) ........................ 10-2020-0056114

(51) Int. Cl.
*H05B 6/76* (2006.01)
*H05B 6/64* (2006.01)

(52) U.S. Cl.
CPC ........... *H05B 6/763* (2013.01); *H05B 6/6414* (2013.01)

(58) Field of Classification Search
CPC ....... H05B 6/763; H05B 6/6414; H05B 6/766
See application file for complete search history.

(56) References Cited

U.S. PATENT DOCUMENTS 3,584,177 A * 6/1971 Bucksbaum ........... H05B 6/763 219/741
3,651,300 A * 3/1972 Haagensen .......... H05B 6/6417 219/744
3,668,357 A * 6/1972 Kobayashi ............. H05B 6/763 219/741
3,767,884 A * 10/1973 Osepchuk ............. H05B 6/763 219/742
4,008,383 A * 2/1977 Tanaka ................... H05B 6/763 219/743
4,081,647 A * 3/1978 Torrey ................... H05B 6/763 174/351
4,137,441 A * 1/1979 Bucksbaum ........... H05B 6/763 219/742

(Continued)

FOREIGN PATENT DOCUMENTS

EP 1744595 1/2007

OTHER PUBLICATIONS

Extended European Search Report in European Appln. No. 20212858.3, dated May 25, 2021, 5 pages.

*Primary Examiner* — Helena Kosanovic
*Assistant Examiner* — Lawrence H Samuels
(74) *Attorney, Agent, or Firm* — Fish & Richardson P.C.

(57) ABSTRACT

An oven includes: a body part defining an inner space that has an opening in one direction, a front plate disposed along a circumference of the opening of the body part and extending in a direction intersecting with the one direction, and a door part configured to contact the front plate to cover the inner space. The door part includes a door plate configured to overlap with the inner space and the front plate in the one direction and providing a protrusion that protrudes from a central portion thereof toward the inner space, a first choke provided in an annular shape along a circumference of the protrusion, and a second choke disposed outside the first choke, provided in an annular shape along a circumference of the first choke, and configured to overlap with the front plate in the one direction.

16 Claims, 10 Drawing Sheets

(56) References Cited

U.S. PATENT DOCUMENTS

| | | | | | |
|---|---|---|---|---|---|
| 4,166,207 | A * | 8/1979 | Burke | H05B 6/763 | 174/377 |
| 4,347,420 | A * | 8/1982 | Ikeda | H05B 6/763 | 219/742 |
| 4,371,770 | A | 2/1983 | Gilliatt | | |
| 4,390,767 | A | 6/1983 | Bucksbaum et al. | | |
| 4,475,023 | A * | 10/1984 | Iwabuchi | H05B 6/763 | 219/742 |
| 4,525,614 | A * | 6/1985 | Ishino | H05B 6/763 | 219/743 |
| 4,563,560 | A * | 1/1986 | Bonner | F24C 15/08 | 220/4.01 |
| 4,584,447 | A * | 4/1986 | Kusunoki | H05B 6/763 | 219/742 |
| 4,591,682 | A * | 5/1986 | Takeuji | F16D 1/06 | 219/754 |
| 4,700,034 | A * | 10/1987 | Lee | H05B 6/763 | 219/742 |
| 4,713,511 | A * | 12/1987 | Katoh | H05B 6/763 | 174/371 |
| 4,742,201 | A * | 5/1988 | Nakano | H05B 6/763 | 219/742 |
| 5,036,171 | A * | 7/1991 | Kim | H05B 6/763 | 219/742 |
| 5,075,525 | A * | 12/1991 | Jung | H05B 6/763 | 219/742 |
| 5,206,478 | A * | 4/1993 | Lee | H05B 6/763 | 174/382 |
| 5,705,797 | A * | 1/1998 | Seo | H05B 6/763 | 219/742 |
| 5,750,969 | A * | 5/1998 | Lee | H05B 6/763 | 174/382 |
| 5,789,724 | A * | 8/1998 | Lerssen | H05B 6/766 | 174/382 |
| 5,973,305 | A * | 10/1999 | Kim | H05B 6/763 | 219/742 |
| 5,981,927 | A * | 11/1999 | Osepchuk | H05B 6/766 | 174/386 |
| 6,812,442 | B2 * | 11/2004 | Kim | H05B 6/763 | 219/742 |
| 7,078,661 | B2 * | 7/2006 | Kim | H05B 6/763 | 219/743 |
| 2003/0141298 | A1 * | 7/2003 | Lee | H05B 6/763 | 219/738 |
| 2004/0079751 | A1 * | 4/2004 | Kim | H05B 6/763 | 219/743 |
| 2005/0056639 | A1 * | 3/2005 | Hu | H05B 6/763 | 219/739 |
| 2005/0067412 | A1 * | 3/2005 | Kim | H05B 6/763 | 219/743 |
| 2007/0012690 | A1 * | 1/2007 | Sim | H05B 6/763 | 219/741 |
| 2007/0012691 | A1 * | 1/2007 | Sim | H05B 6/763 | 219/741 |
| 2007/0039952 | A1 * | 2/2007 | Kim | H05B 6/763 | 219/741 |
| 2013/0228568 | A1 * | 9/2013 | Huynh | H05B 6/763 | 219/774 |
| 2016/0219656 | A1 * | 7/2016 | Hunter, Jr. | H05B 6/6414 | |
| 2018/0343712 | A1 * | 11/2018 | An | H05B 6/6414 | |
| 2019/0021145 | A1 * | 1/2019 | Ha | H05B 6/766 | |

* cited by examiner (a)

(b)

OVEN HAVING MULTIPLE CHOKES

CROSS-REFERENCE TO RELATED APPLICATION

Pursuant to 35 U.S.C. § 119(a), this application claims the benefit of the earlier filing date and the right of priority to Korean Patent Application No. 10-2020-0056114, filed on May 11, 2020, the contents of which is incorporated by reference herein in its entirety.

TECHNICAL FIELD

The present disclosure relates to an oven with multiple chokes.

BACKGROUND

An oven is a cooking appliance that can cook food (objected to be cooked or cooking ingredients) using a heat source. Such oven is widely used by virtue of simplicity of manipulation.

Ovens can heat food in a variety of ways. For example, ovens can use microwaves, infrared radiation, convection, etc. to cook food.

Among others, an oven using microwaves to cook food is called a microwave oven (microwave range).

A conventional microwave oven includes a cavity configured to be open and closed, and a generator for generating microwaves irradiated into the cavity. For example, a magnetron or a Solid State Power Module (SSPM) can be used as the generator.

In addition, the conventional microwave oven is provided with a door configured to open and close the cavity in order to put food in the cavity.

Since the microwaves generated from the generator can adversely affect a user, a shielding structure is provided on the boundary between the door and the cavity to prevent the microwaves from being exposed to the outside of the cavity.

Conventional generators can generate microwaves having a plurality of frequencies in order to improve heating performance. However, when a single shielding structure is used, the microwaves having the plurality of frequencies may not effectively be shielded.

For example, a cooking system can have multiple shielding structures. Specifically, the cooking system includes multiple chokes provided on a door to suppress microwaves having a plurality of frequencies from leaking to the outside of a cavity.

However, the multiple chokes are configured to face a front panel provided on a circumference of an opening of the cavity. Therefore, as a plurality of the chokes are provided in the cooking system, the length of the front panel increases.

That is, as the area occupied by the front panel on one surface coupled to the door increases, the area of the opening of the cavity and the volume of the cavity can decrease.

SUMMARY

The present disclosure is directed to an oven having a shielding structure.

According to one aspect of the subject matter described in this application, an oven includes a body part defining an inner space that has an opening in one direction, a front plate disposed along a circumference of the opening of the body part and extending in a direction intersecting with the one direction, a door part configured to contact the front plate to cover the inner space. The door part includes a door plate configured to overlap with the inner space and the front plate in the one direction and providing a protrusion that protrudes from a central portion thereof toward the inner space, a first choke provided in an annular shape along a circumference of the protrusion, and a second choke disposed outside the first choke, provided in an annular shape along a circumference of the first choke, and configured to overlap with the front plate in the one direction. The first choke includes an inner portion facing the inner space and an outer portion facing the front plate.

Implementations according to this aspect can include one or more of the following features. For example, a shortest distance between the first choke and the front plate can be shorter than a shortest distance between the second choke and the front plate.

In some examples, the first choke can include a first base portion having a predetermined width in a direction intersecting with the one direction and extending in an annular shape along the circumference of the protrusion and a first extension portion extending in the one direction from an outer circumference of the first base portion to be spaced apart from the front plate. The first base portion can include an inner portion facing the inner space and an outer portion facing the front plate. In some implementations, the first extension portion can be provided with a plurality of first slits extending in the one direction by a predetermined length. Each of the plurality of first slits can define an opening toward the door plate and each of the plurality of first slits can be disposed to be spaced apart from another first slit of the plurality of first slits along the outer circumference of the first base portion.

In some implementations, the inner portion of the first base portion can be coupled to a surface of the protrusion facing the inner space. In some implementations, the second choke can include a second base portion having a predetermined width in a direction intersecting with the one direction and extending in an annular shape along the circumference of the first choke, a second inner extension portion extending in the one direction from an inner circumference of the second base portion to be spaced apart from the front plate, and a second outer extension portion extending in the one direction from an outer circumference of the second base portion to be spaced apart from the front plate.

In some examples, the second choke can include a plurality of second slits. Each of the plurality of second slits can be spaced apart from another second slit of the plurality of second slits in an extending direction of the second base portion. In some implementations, each of the second slits can be configured such that a portion defined in the second inner extension portion and a portion defined in the second outer extension portion have different widths from each other in the extending direction of the second base portion.

In some examples, a width of the portion of the second slit defined in the second inner extension portion can be longer than a width of the portion of the second slit defined in the second outer extension portion. In some examples, the second outer extension portion can be disposed such that an end portion thereof is spaced apart from the door plate by a predetermined distance.

In some implementations, the oven can further include a choke cover disposed outside the first choke, provided in an annular shape along the circumference of the first choke, and configured to overlap with the front plate in the one direction. The choke cover can be configured to partition the second choke and the front plate from each other. In some examples, the choke cover can include a cover base portion having a predetermined width in a direction intersecting with the one direction, having a surface facing the front plate, and disposed between the second choke and the front plate, a cover inner extension portion extending in the one direction from an inner circumference of the cover base portion to be spaced apart from the front plate and disposed between the first extension portion and the second choke, and a cover outer extension portion extending in the one direction from an outer circumference of the cover base portion to be spaced apart from the front plate and disposed outside the second choke.

In some examples, the cover inner extension portion can extend to be shorter than the first extension portion. In some examples, the cover inner extension portion can be configured such that a portion thereof facing the first extension portion contacts the first extension portion.

In some implementations, the cover outer extension portion can be configured such that a portion thereof facing the second choke contacts the second choke. In some implementations, the cover outer extension portion can be configured such that an end portion thereof is contacts the door plate.

In some examples, the oven can further include a third choke disposed outside the second choke and inside the choke cover and provided in an annular shape along a circumference of the second choke. In some implementations, the third choke can include a third base portion having a predetermined width in a direction intersecting with the one direction and extending in an annular shape along the circumference of the second choke, a third inner extension portion extending in the one direction from an inner circumference of the third base portion to be spaced apart from the front plate, and a third outer extension portion extending in the one direction from an outer circumference of the third base portion to be spaced apart from the front plate.

In some examples, the third outer extension portion can be disposed such that an end portion thereof is spaced apart from the door plate by a predetermined distance. In some implementations, the third inner extension portion can be provided with a third coupling portion, the third coupling portion extending from an end portion thereof and configured to bend toward the protrusion, third coupling portion can be provided with a plurality of third coupling holes defined through an inner circumference thereof, the door plate can be provided with a plurality of second door plate coupling grooves recessed in a portion thereof facing the plurality of third coupling holes, and a plurality of third coupling members can be coupled to the plurality of second door plate coupling grooves through the plurality of third coupling holes.

According to an implementation, the following effects can be achieved.

First, a door has a plurality of chokes that provides a structure for suppressing leakage of microwaves from a cavity.

The plurality of chokes can suppress a leakage of microwaves having a plurality of frequencies.

In addition, the plurality of chokes can face a front plate disposed on a circumference of an opening of the cavity, and a choke closest to the cavity is configured such that at least a part thereof faces the cavity.

Accordingly, since a width of the front panel facing the plurality of chokes is reduced, an area occupied by the opening of the cavity on one surface of the oven can increase.

As a result, a capacity of the cavity cannot be excessively reduced, and leakage of a large amount of microwaves to the outside of the cavity can be suppressed.

In addition, each choke can include a plurality of slits, and each slit can be configured such that a width of one portion is longer than that of another portion.

Therefore, a thickness of the choke can be reduced while maintaining an inductance component of the choke. This can maintain shielding performance of the choke and simultaneously reducing the thickness of the choke so as to reduce the size of the door.

DETAILED DESCRIPTION

Description will now be given in detail of an oven 10 having multiple chokes, with reference to the accompanying drawings.

In the following description, in order to clarify the features of the present disclosure, description of some components will be omitted.

The term "oven" used hereinafter can refer to an appliance that can accommodate food (or cooking ingredients) in a space defined therein to heat and cook the food. In some implementations, the oven 10 can include a microwave range or the like.

The term "electric connection" can be used when two or more members are connected in a manner of allowing an electric current or electrical signal to be transmitted. The electric connection can be achieved by contact between conductive members, in a wired manner using a conductive member, or the like.

The term "radio wave" used in the following description can refer to electromagnetic wave having a wavelength of infrared ray or more with a frequency of 3 KHz to 106 MHz. For example, the radio wave can be microwave.

The terms "upper side (or part)," "lower side," "front side," "rear side," "left side," and "right side" used hereinafter will be understood with reference to coordinate systems shown in FIGS. 1 to 3.

An oven 10 according to an implementation can accommodate food (or an object to be cooked, or cooking ingredients) in a cavity 120 defined therein. The oven 10 can heat food using radio waves which are generated in a radio wave generator and radiated into the cavity 120 through an antenna. In some implementations, the radio wave can be microwave.

In some implementations, the radio wave generator can be provided outside the cavity 120, and the antenna can be provided inside the cavity 120. The radio wave generator and the antenna can be electrically connected to each other.

Figure 1:
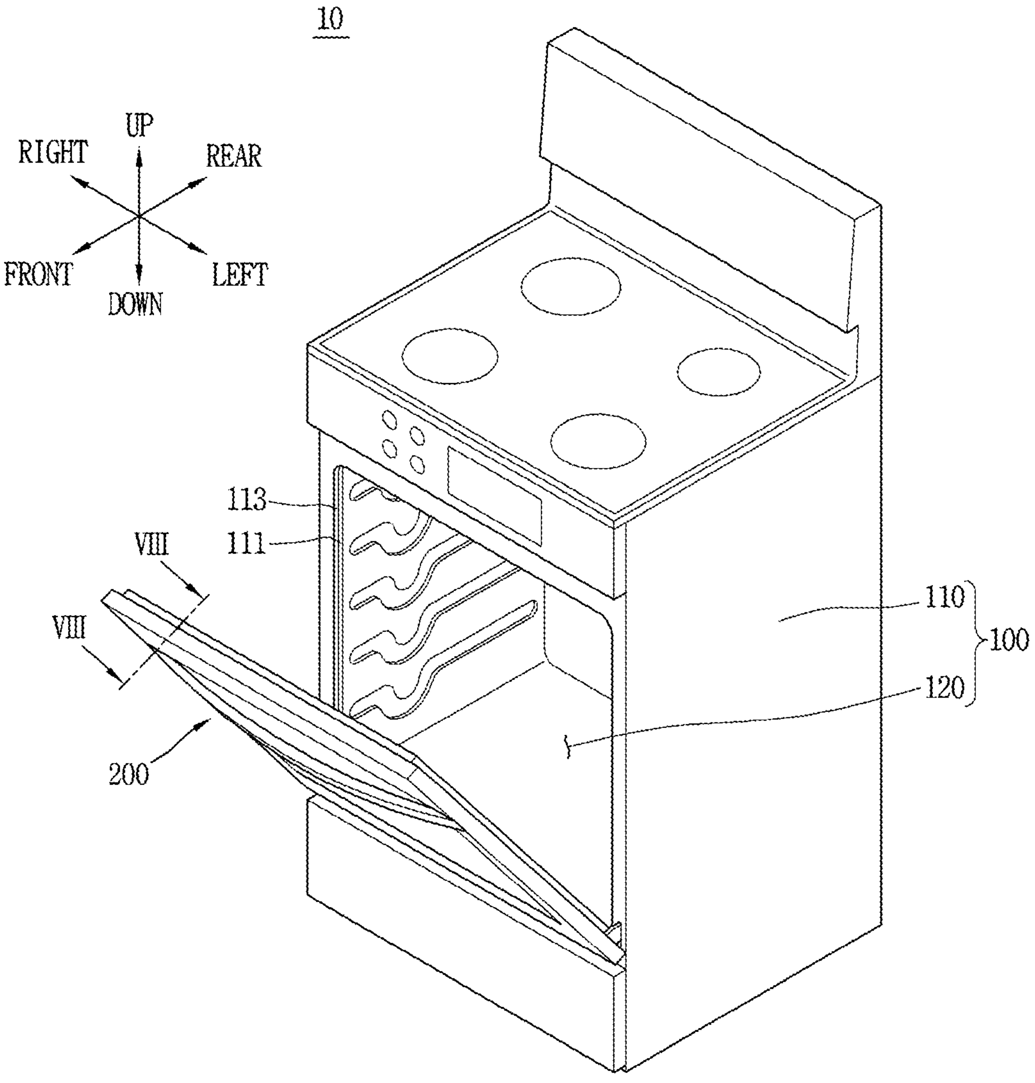
FIG. 1 is a diagram illustrating an exemplary oven having a door.
Figure 2:
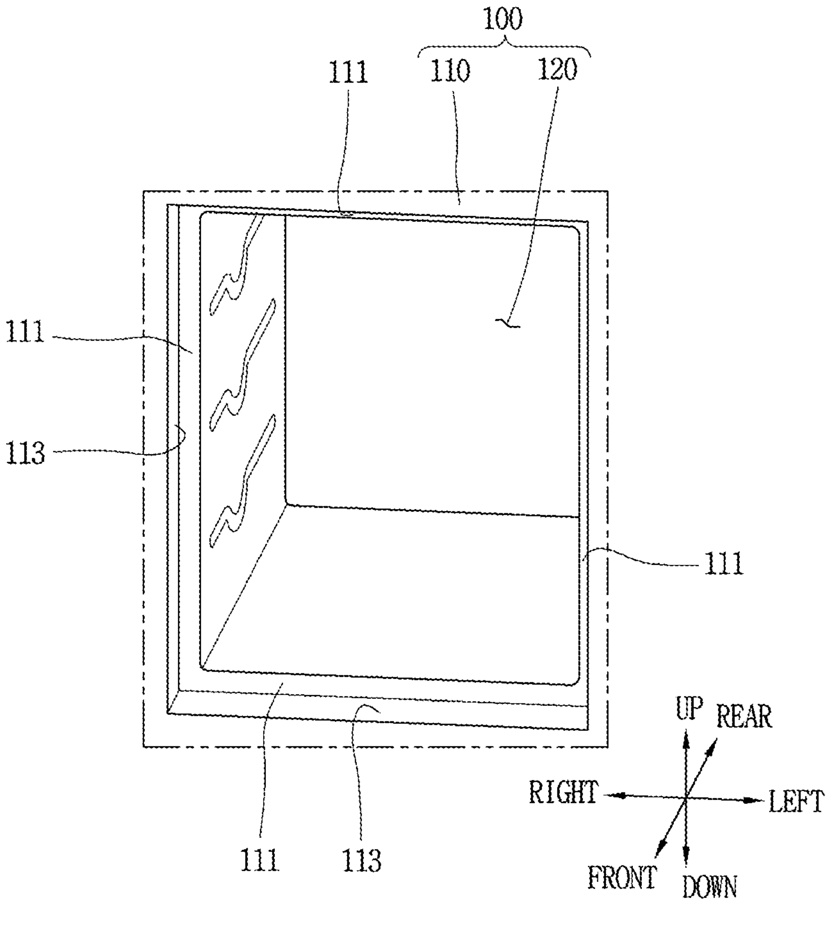
FIG. 2 is a diagram illustrating an opening of a cavity of the exemplary oven of FIG. 1.

Referring to FIGS. 1 and 2, the oven 10 can include a body part 100 having the cavity 120 defined therein, and a door part 200 configured to open and close the body part 100.

The body part 100 defines can define an appearance of the oven 10. The body part 100 can include an externally exposed portion of the oven 10. For example, the body part 100 can be a case of the oven 10.

A predetermined space is defined inside the body part 100. An ingredient to be cooked (cooking ingredient) can be accommodated in the space. In addition, an antenna configured to irradiate radio waves for heating the cooking ingredient can be provided in the space.

As shown in FIGS. 1 and 2, the body part 100 can be provided in a hexahedral shape having a predetermined space therein. However, the present disclosure is not limited thereto, and can be formed in various shapes having a predetermined space therein.

In some implementations, the body part 100 can include an outer frame 110 and a cavity 120.

The outer frame 110 can define an outer side of the body part 100. For example, the outer frame 110 is an externally exposed portion of the body part 100. In some implementations, the outer frame 110 can define a framework of the body part 100.

A predetermined space is defined inside the outer frame 110. A part of the space can be defined as the cavity 120 in which a cooking ingredient (or food) is accommodated.

The outer frame 110 can be made of an insulating material to prevent a transmission of the radio waves that are generated by the antenna to the outside of the body part 100. Further, the outer frame 110 made of the insulating material can protect a user from electric shock caused due to the user contacting the outer frame 110 when an electric short circuit occurs inside the body part 100.

In some implementations, the outer frame 110 can be made of a heat-resistant material to prevent the outer frame 110 from being damaged due to high heat generated inside the cavity 120.

A radio wave generator and the antenna can be coupled to the outer frame 110.

The cavity 120 that is open toward the front of the body part 100 can be defined in the outer frame 110.

The cavity 120 is a space in which food (cooking ingredient) is accommodated. The cavity 120 can be surrounded by the outer frame 110, and the opening of the cavity 120 can be covered with the door part 200.

For example, the cavity 120 can be opened and closed by the door part 200. The food can be put into the cavity 120 by opening the door part 200. In some implementations, the cavity 120 can be shielded by closing the door part 200.

The antenna can be provided in the cavity 120. The food accommodated in the cavity 120 can be heated by the radio waves irradiated from the antenna.

When the radio waves inside the cavity 120 leak into a fine gap between the outer frame 110 and the door part 200, the radio waves can affect the user of the oven 10.

Accordingly, an expanded portion can be provided on a circumference of the opening of the cavity 120 to face a structure for shielding the radio waves.

The expanded portion can refer to a portion of the outer frame 110 that is expanded outward from the circumference of the opening of the cavity 120.

The expanded portion can be defined as a front plate 111.

As shown in FIGS. 1 and 2, the front plate 111 can be an annular portion that extends upward, downward, left and right from the circumference of the opening of the cavity and can have a predetermined width.

In some implementations, the front plate 111 can have a different shape that corresponds to a shape of the opening of the cavity 120.

A front surface of the front plate 111 and the shielding structure provided on the door part 200 can face each other. This can suppress radio waves inside the cavity 120 from leak into the gap between the front plate 111 and the door part 200.

In addition, a side plate 113 can protrude forward from an outer circumference of the front plate 111 by a predetermined length. The door part 200 and the cavity 120 can be coupled to each other more precisely by the side plate 113.

The side plate 113 can refer to a portion of the outer frame 110 that is connected to the outer circumference of the front plate 111.

As shown in FIGS. 1 and 2, the side plate 113 can protrude forward along the outer circumference of the front plate 111. However, the present disclosure is not limited thereto. For example, in some implementations, the side plate 113 can be provided only on the left side and the right side of the opening of the cavity 120.

Figure 3:
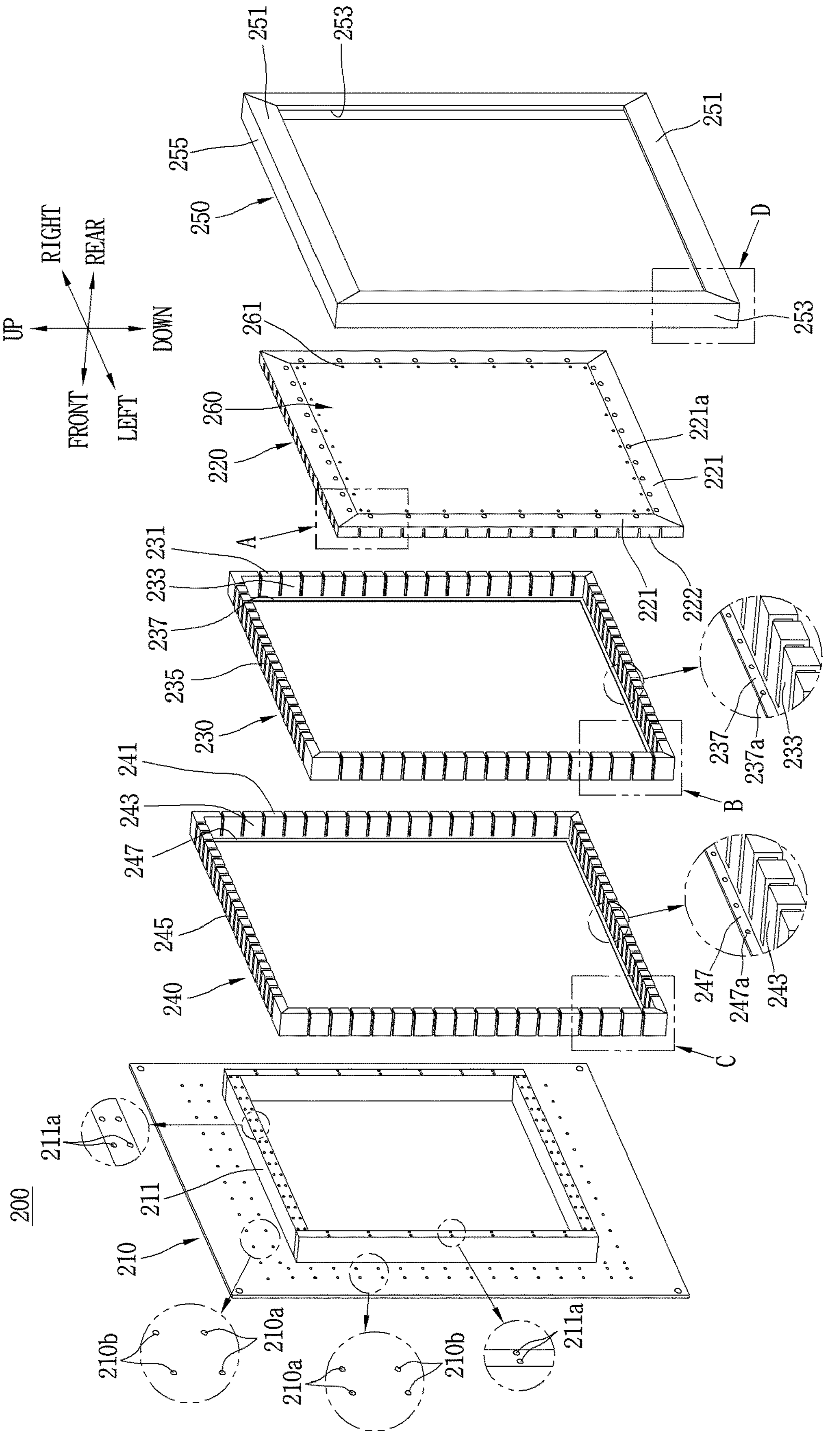
FIG. 3 is an exploded perspective view illustrating a door part for opening and closing the cavity of FIG. 2.

Referring to FIG. 3, the door part 200 that is configured to open and close the opening of the cavity 120 can include a door plate 210, first to third chokes 220, 230, and 240, a choke cover 250, and an inner glass 260.

The door plate 210 can be configured to fully cover the opening of the cavity 120 when the door part 200 and the body part 100 are coupled to each other. For example, when the door part 200 and the body part 100 are projected on the same plane in a coupled state, the cavity 120 can be included inside a circumference of the door plate 210.

As shown in FIG. 3, in some implementations, the door plate 210 can be a plate-shaped member in a shape having a rectangular cross section. However, the present disclosure is not limited thereto. For example, the door plate 210 can be formed in various shapes capable of covering the opening of the cavity 120.

A protrusion 211 that protrudes in an annular shape toward the cavity 120 along the circumference of the opening of the cavity 120 can be provided on a central portion of the door plate 210.

As shown in FIG. 3, the protrusion 211 can protrude in a shape of a rectangular ring. However, the present disclosure is not limited thereto. For example, the protrusion 211 can vary to correspond to the shape of the opening of the cavity 120.

The protrusion 211 can be configured to overlap the cavity 120 in a front and rear direction.

The protrusion 211 can be provided on one surface of the door plate 210 that faces the cavity 120. The protrusion 211 can protrude toward the cavity 120 at an inner side of the circumference of the opening of the cavity 120.

The protrusion 211 can be disposed to be spaced apart by a predetermined distance inward from the circumference of the opening of the cavity 120.

A plurality of protrusion coupling grooves 211*a* can be provided in a recessing manner on a rear surface of the protrusion 211 that faces the cavity 120.

The plurality of protrusion coupling grooves 211*a* can be disposed along an inner circumference and an outer circumference of the rear surface of the protrusion 211. Further, each of the plurality of protrusion coupling grooves is spaced apart from another protrusion coupling groove by predetermined intervals.

Among the plurality of protrusion coupling grooves 211*a*, the protrusion coupling grooves 211*a* disposed along the inner circumference of the rear surface of the protrusion 211 can be used for coupling with an inner glass 260.

Further, among the plurality of protrusion coupling grooves 211*a*, the protrusion coupling grooves 211*a* disposed along the outer circumference of the rear surface can be used for coupling with a first choke 220.

The protrusion 211 can be configured to partially overlap with the side plate 113 at the left and right sides.

A protruded length of the protrusion 211 can be equal to or shorter than a length of the side plate 113 in the front and rear direction.

The first choke 220 can be coupled to an outer portion of the rear surface of the protrusion 211.

The first choke 220 can be provided in an annular shape along the circumference of the protrusion 211 so as to be coupled to the protrusion 211.

The first choke 220 can be configured such that an inner portion faces the cavity 120 and an outer portion faces the front plate 111.

The first choke 220 can prevent radio waves included in a predetermined frequency band from leaking between the door part 200 and the front plate 111.

The first choke 220 can be provided with a heat-resistant material in order to suppress heat inside the cavity 120 from being discharged to the outside of the cavity 120. In some implementations, the first choke 220 can be provided with heat-resistant plastic and/or heat-resistant rubber.

Figure 4A:
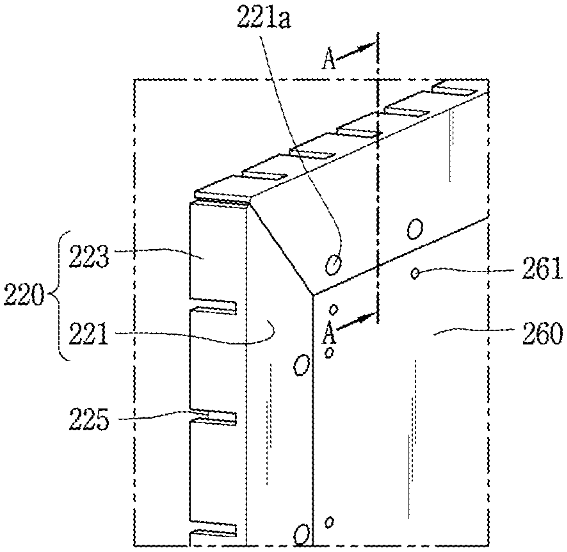
FIGS. 4A and 4B are enlarged views illustrating an example of a first choke.
Figure 4B:
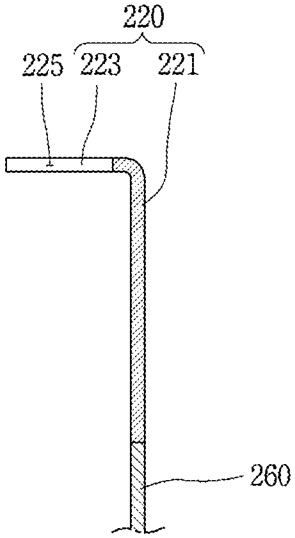

FIGS. 4A and 4B are a partial perspective view and a cross-sectional view of the first choke 220 in an enlarged manner.

FIG. 4A is an enlarged view illustrating a region A of the first choke 220 of FIG. 3, and FIG. 4B is a cross-sectional view illustrating the first choke 220 illustrated in FIG. 4A, taken along the line A-A.

Figure 9:
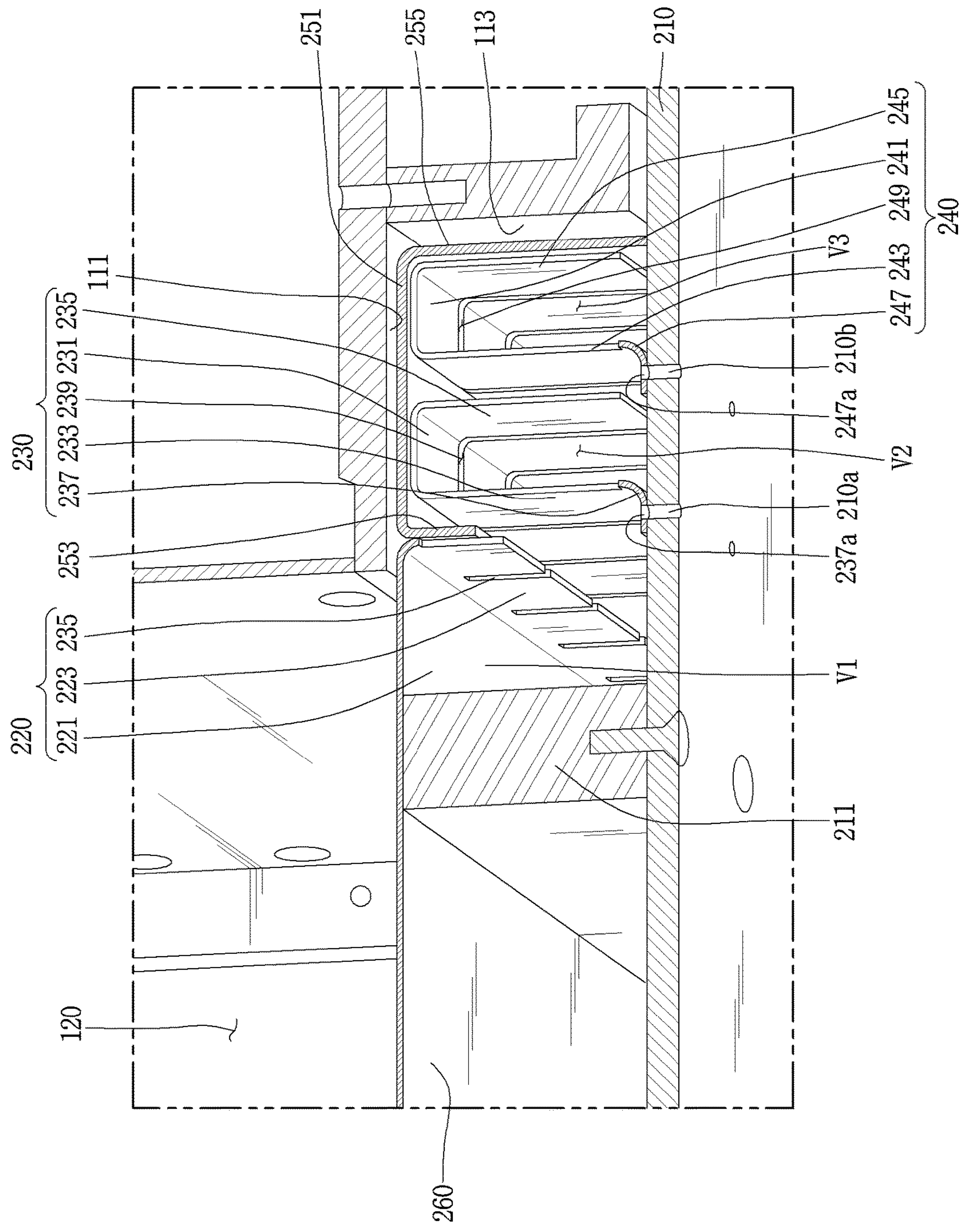
FIG. 9 is a conceptual diagram illustrating a state in which the door part of FIG. 8 shields the opening of the cavity.

A structure in which the first choke 220 is coupled to the protrusion 211 is shown in FIG. 9 and will be described later.

As illustrated in FIGS. 4A, 4B, and 9, the first choke 220 can have a predetermined width in a direction intersecting with the front and rear sides, and can include a first base portion 221 extending in an annular shape along the circumference of the protrusion 211.

A portion of the first base portion adjacent to an inner circumference can be coupled to the rear surface of the protrusion 211 that faces the cavity 120.

A plurality of first coupling holes 221*a* can be provided through the portion of the first base portion 221 adjacent to the inner circumference. The plurality of first coupling holes 221*a* can be disposed along the inner circumference of the first base portion 221 in a spacing manner.

The plurality of first coupling holes 221*a* can be located to correspond to the plurality of protrusion coupling grooves 211*a* provided at the protrusion 211. Specifically, the plurality of first coupling holes 221*a* can be located to correspond to the protrusion coupling grooves 211*a* that are adjacent to the outer circumference of the protrusion 211.

In a state in which the plurality of first coupling holes 221*a* and the plurality of protrusion coupling grooves 211*a* are aligned to communicate with each other, a plurality of first coupling members can be inserted through the plurality of first coupling holes 221*a* to be coupled to the plurality of protrusion coupling grooves 211*a*.

For example, the first base portion 221 can be fixed to the protrusion 211 by coupling force between the plurality of first coupling members and the plurality of protrusion coupling grooves 211*a*.

In some implementations, the plurality of first coupling members can be provided in the form of coupling screws or rivets.

A portion of the first base portion 221 adjacent to an outer circumference can overlap the front plate 111 in the front and rear direction.

The portion overlapping the front plate 111 can be disposed to face the front plate 111 when the door and the outer frame 110 are coupled to each other.

The shortest distance between the portion of the first base portion 221 facing the front plate 111 and the front plate 111 can be shorter than the shortest distance between the second and third chokes 230 and 240 and the front plate 111.

The first choke 220 can further include a first extension portion 223 extending forward from the outer circumference of the first base portion 221 to be spaced apart from the front plate 111.

The first extension portion 223 can be an annular plate having a predetermined length in the front and rear direction, and a rear circumference of the first extension portion 223 and the outer circumference of the first base portion 221 can be connected to each other at a predetermined angle. In some implementations, the first base portion 221 and the connected portion can be perpendicularly connected to each other.

The connected portion between the first extension portion 223 and the first base portion 221 can be provided in a curved shape.

The first extension portion 223 can overlap the side plate 113 in a direction intersecting in an up and down direction.

A front end portion of the first extension portion 223 can be spaced apart by a predetermined distance from the rear surface of the door plate 210.

A length of the first extension portion 223 in the front and rear direction can be shorter than a length of the protrusion 211 in the front and rear direction. In addition, the length of the first extension portion 223 in the front the rear direction can be shorter than a length of the side plate 113 in the front and rear direction.

The first extension portion 223 can be provided with a plurality of first slits 225 that includes an opening toward the door plate 210 and extends by a predetermined length in the front and rear direction.

The first slits 225 may refer to recesses that are defined rearward by a predetermined length from the front end portion of the first extension portion 223.

The first slit 225 can have a predetermined length in the front and rear direction, and a predetermined width in a direction of the outer circumference of the first base portion 221.

The first slit 225 can be a narrow long hole having a length longer than a width.

The plurality of first slits 225 can be formed over the entire first extension portion 223 except for the connected portion with the first base portion 221.

Each of the plurality of first slits 225 can be disposed to be spaced apart from another first slits by predetermined distances along the outer circumference of the first base portion 221.

Referring to FIG. 3, the second choke 230 can be disposed outside the circumference of the first extension portion 223.

The second choke 230 can be provided in an annular shape along the circumference of the first choke 220 at the outside of the first choke 220 and coupled to the rear surface of the door plate 210.

The second choke 230 can be configured to overlap the front plate 111 in the front and rear direction.

The second choke 230 can prevent radio waves included in a predetermined frequency band from leaking between the door part 200 and the front plate 111.

The frequency band in which the leakage of the radio waves is suppressed by the second choke 230 can be different from a frequency band in which the leakage of the radio waves is suppressed by the first choke 220.

The second choke 230 can be provided with a heat-resistant material in order to suppress heat inside the cavity 120 from being discharged to the outside of the cavity 120. In some implementations, the second choke 230 can be provided with heat-resistant plastic and/or heat-resistant rubber.

Figure 5A:
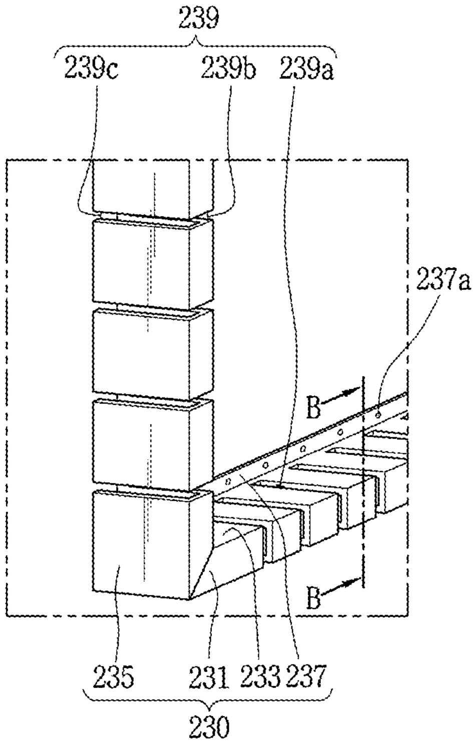
FIGS. 5A and 5B are enlarged views illustrating an example of a second choke.
Figure 5B:
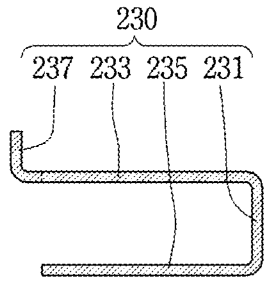

FIGS. 5A and 5B are a partial perspective view and a cross-sectional view of the second choke 230 in an enlarged manner.

FIG. 5A is an enlarged view illustrating a region B of the second choke 230 of FIG. 3, and FIG. 5B is a cross-sectional view illustrating the second choke 230 illustrated in FIG. 5A, taken along the line B-B.

A structure in which the second choke 230 is coupled to the door plate 210 is shown in FIG. 9.

As illustrated in FIGS. 5A, 5B, and 9, the second choke 230 can have a predetermined width in a direction intersecting with the front and rear direction, and can include a second base portion 231 extending in an annular shape along the circumference of the first choke 220.

The second base portion 231 can overlap the front plate 111 in the front and rear direction, and can be spaced apart from the front plate 111 by a predetermined distance.

The shortest distance between the second base portion 231 and the front plate 111 can be longer than the shortest distance between the first choke 220 and the front plate 111.

The second choke 230 can further include a second inner extension portion 233 extending in a direction from an inner circumference of the second base portion 231 to be away from the front plate 111, and a second outer extension portion 235 extending in a direction from an outer circumference of the second base portion 231 to be away from the front plate 111.

The second inner extension portion 233 can be an annular plate extending forward from the inner circumference of the second base portion 231 by a predetermined length, and the second outer extension portion 235 can be an annular plate extending forward from the outer circumference of the second base portion 231 by a predetermined length.

The second base portion 231 can be connected to the second inner extension portion 233 and the second outer extension portion 235 at predetermined angles.

The inner circumference of the second base portion 231 and a rear end portion of the second inner extension portion 233 can be connected to each other at a predetermined angle, and the outer circumference of the second base portion 231 and a rear end portion of the second outer extension portion 235 can be connected to each other at a predetermined angle. In some implementations, the second base portion 231 can be perpendicularly connected to the second inner extension portion 233 and the second outer extension portion 235.

In some implementations, a portion at which the second inner and outer extension portions 233 and 235 and the second base portion 231 are connected to each other can be provided in a curved shape.

The second inner extension portion 233 and the second outer extension portion 235 can face each other, and a length of the second inner extension portion 233 in the front and rear direction can be longer than a length of the second outer extension portion 235 in the front and rear direction.

In addition, the second inner extension portion 233 and the second outer extension portion 235 can overlap the side plate 113 in a direction intersecting with the front and rear direction.

Further, a front end portion of the second outer extension portion 235 can be spaced apart by a predetermined distance from the rear surface of the door plate 210.

The spacing between the second outer extension portion 235 and the door plate 210 can be shorter than a spacing between the first extension portion 223 of the first choke 220 and the door plate 210. The length of the second outer extension portion 235 in the front and rear direction can be shorter than the length of the first extension portion 223 in the front and rear direction.

The second inner extension portion 233 can be provided with a second coupling portion 237 that is bent from the rear end portion thereof and extends toward the protrusion 211.

The second coupling portion 237 can be an annular plate having a predetermined width in a direction intersecting with the front and rear direction, and an outer circumference of the second coupling portion 237 and the rear end portion of the second inner extension portion 233 can be connected to each other at a predetermined angle. In some implementations, the second coupling portion 237 can be perpendicularly connected to the second inner extension portion 233.

The portion at which the second coupling portion 237 and the second inner extension portion 233 are connected to each other can be provided in a curved shape.

The second coupling portion 237 can be provided with a plurality of second coupling holes 237*a* formed through an inner circumference thereof in the front and rear direction. The plurality of second coupling holes 237*a* can be spaced apart by predetermined distances from one another along the inner circumference of the second coupling portion 237.

The plurality of second coupling holes 237*a* can be used to fix the second choke 230 to the door plate 210.

A plurality of first door plate coupling grooves 210*a* can be recessed in a portion of the rear surface of the door plate 210 that faces the plurality of second coupling holes 237*a*.

In a state in which the plurality of second coupling holes 237*a* and the plurality of first door plate coupling grooves 210*a* are aligned to communicate with each other, a plurality of second coupling members can be inserted through the plurality of second coupling holes 237*a* to be coupled to the plurality of first door plate coupling grooves 210*a*.

For example, the second choke 230 can be fixed to the door plate 210 by coupling force between the plurality of second coupling members and the plurality of first door plate coupling grooves 210*a*.

In some implementations, the plurality of second coupling members can be provided in the form of coupling screws or rivets.

The second choke 230 can be provided with a plurality of second slits 239 that are spaced apart from one another in a direction in which the second choke 230 extends in the annular shape.

The second slits 239 can have predetermined widths in a direction in which the second choke 230 extends in the annular shape.

Each of the second slits 239 can include a first portion 239*a* formed in the second inner extension portion 233, a second portion 239*b* formed in the second base portion 231, and a third portion 239*c* formed in the second outer extension portion 235.

The first portion 239*a* can be defined by cutting out the second inner extension portion 233 by a predetermined length in the front and rear direction. The second portion 239*b* can be defined by cutting out the second base portion 231 by a predetermined length in a lateral (left and right) direction of the second base portion 231. The third portion 239*c* can be defined by cutting out the second outer extension portion 235 by a predetermined length in the front and rear direction.

The first portion 239*a*, the second portion 239*b*, and the third portion 239*c* can be connected to one another, and the third portion 239*c* defines an opening toward the rear surface of the door plate 210 at the front end portion of the second outer extension portion 235.

The second slit 239 can be a narrow long hole having a length longer than a width.

The plurality of second slits 239 can be defined over the entire second choke 230 except for the second coupling portion 237 and the portion where the second coupling portion 237 and the second inner extension portion 233 are connected to each other.

The plurality of second slits 239 can be disposed to be spaced apart from one another by predetermined distances in the direction in which the second choke 230 extends in the annular shape.

Referring to FIG. 3, a third choke 240 can be disposed outside the circumference of the second outer extension portion 235.

The third choke 240 can be provided in an annular shape along the circumference of the second choke 230 at the outside of the second choke 230 and coupled to the rear surface of the door plate 210.

The third choke 240 can be configured to overlap the front plate 111 in the front and rear direction.

The third choke 240 can prevent radio waves included in a predetermined frequency band from leaking between the door part 200 and the front plate 111.

The frequency band in which the leakage of the radio waves is suppressed by the third choke 240 can be different from the frequency bands in which the leakage of the radio waves is suppressed by the first and second chokes 220 and 230.

The third choke 240 can be provided with a heat-resistant material in order to suppress heat inside the cavity 120 from being discharged to the outside of the cavity 120. In some implementations, the third choke 240 can be provided with heat-resistant plastic and/or heat-resistant rubber.

Figure 6A:
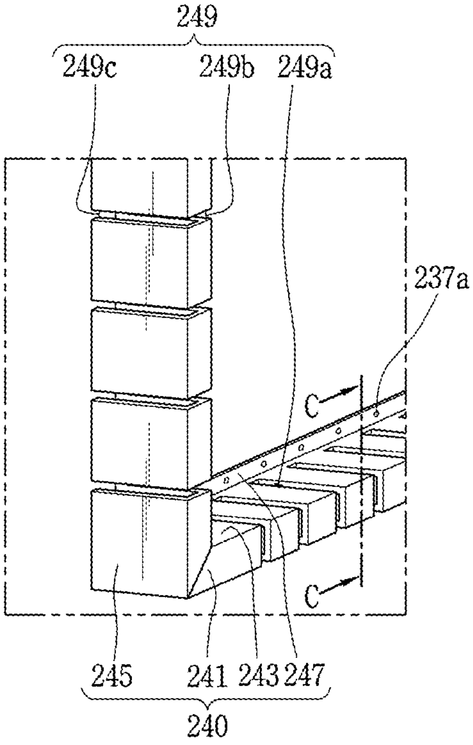
FIGS. 6A and 6B are enlarged views illustrating an example of a third choke.
Figure 6B:
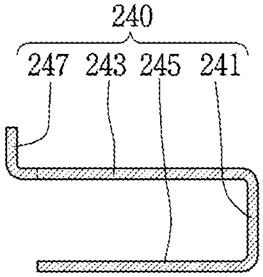

FIGS. 6A and 6B are a partial perspective view and a cross-sectional view of the third choke 240 in an enlarged manner.

FIG. 6A is an enlarged view illustrating a region C of the third choke 240 of FIG. 3, and FIG. 6B is a cross-sectional view illustrating the third choke 240 illustrated in FIG. 6A, taken along the line C-C.

A structure in which the third choke 240 is coupled to the door plate 210 is shown in FIG. 9.

As illustrated in FIGS. 6A, 6B, and 9, the third choke 240 can have a predetermined width in a direction intersecting with the front and rear direction, and can include a third base portion 241 extending in an annular shape along the circumference of the second choke 230.

The third base portion 241 can overlap the front plate 111 in the front and rear direction, and can be spaced apart from the front plate 111 by a predetermined distance.

The shortest distance between the third base portion 241 and the front plate 111 can be longer than the shortest distance between the first choke 220 and the front plate 111.

In some implementations, the shortest distance between the third base portion 241 and the front plate 111 can be equal to the shortest distance between the second choke 230 and the front plate 111.

In addition, the third choke 240 can include a third inner extension portion 243 extending in a direction from an inner circumference of the third base portion 241 to be away from the front plate 111, and a third outer extension portion 245 extending in a direction from an outer circumference of the third base portion 241 to be away from the front plate 111.

The third inner extension portion 243 can be an annular plate extending forward from the inner circumference of the third base portion 241 by a predetermined length, and the third outer extension portion 245 can be an annular plate extending forward from the outer circumference of the third base portion 241 by a predetermined length.

The third base portion 241 can be connected to the third inner extension portion 243 and the third outer extension portion 245 at predetermined angles.

The inner circumference of the third base portion 241 and a rear end portion of the third inner extension portion 243 can be connected to each other at a predetermined angle, and the outer circumference of the third base portion 241 and a rear end portion of the third outer extension portion 245 can be connected to each other at a predetermined angle. In some implementations, the third base portion 241 can be perpendicularly connected to the third inner extension portion 243 and the third outer extension portion 245.

In some implementations, a portion at which the third inner and outer extension portions 243 and 245 and the third base portion 241 are connected to each other can be provided in a curved shape.

The third inner extension portion 243 and the third outer extension portion 245 can face each other, and a length of the third inner extension portion 243 in the front and rear direction can be longer than a length of the third outer extension portion 245 in the front and rear direction.

In addition, the third inner extension portion 243 and the third outer extension portion 245 can overlap the side plate 113 in a direction intersecting with the front and rear direction.

Further, a front end portion of the third outer extension portion 245 can be spaced apart by a predetermined distance from the rear surface of the door plate 210.

The spacing between the third outer extension portion 245 and the door plate 210 can be shorter than the spacing between the first extension portion 223 and the door plate 210. The length of the third outer extension portion 245 in the front and rear direction can be shorter than the length of the first extension portion 223 in the front and rear direction.

In some implementations, the length of the third outer extension portion 245 in the front and rear direction can be equal to the length of the second outer extension portion 235 in the front and rear direction.

The third inner extension portion 243 can be provided with a third coupling portion 247 that is bent from the rear end portion thereof and extends toward the protrusion 211.

The third coupling portion 247 can be an annular plate having a predetermined width in a direction intersecting with the front and rear direction, and an outer circumference of the third coupling portion 247 and the rear end portion of the third inner extension portion 243 can be connected to each other at a predetermined angle. In some implementations, the third coupling portion 247 can be perpendicularly connected to the third inner extension portion 243.

The portion at which the third coupling portion 247 and the third inner extension portion 243 are connected to each other can be provided in a curved shape.

The third coupling portion 247 can be provided with a plurality of third coupling holes 247*a* formed through an inner circumference thereof in the front and rear direction. The plurality of third coupling holes 247*a* can be spaced apart by predetermined distances from one another along the inner circumference of the third coupling portion 247.

The plurality of third coupling holes 247*a* can be used to fix the third choke 240 to the door plate 210.

A plurality of second door plate coupling grooves 210*b* can be recessed in a portion of the rear surface of the door plate 210 that faces the plurality of third coupling holes 247*a*.

In a state in which the plurality of third coupling holes 247*a* and the plurality of second door plate coupling grooves 210*b* are aligned to communicate with each other, a plurality of third coupling members can be inserted through the plurality of third coupling holes 247*a* to be coupled to the plurality of second door plate coupling grooves 210*b*.

For example, the third choke 240 can be fixed to the door plate 210 by coupling force between the plurality of third coupling members and the plurality of second door plate coupling grooves 210*b*.

In some implementations, the plurality of third coupling members can be provided in the form of coupling screws or rivets.

The third choke 240 can be provided with a plurality of third slits 249 spaced apart from one another in a direction in which the third choke 240 extends in the annular shape.

The third slits 249 can have predetermined widths in a direction in which the third choke 240 extends in the annular shape.

Each of the third slits 249 can include a first portion 249*a* defined in the third inner extension portion 243, a second portion 249*b* defined in the third base portion 241, and a third portion 249*c* defined in the third outer extension portion 245.

The first portion 249*a* can be defined by cutting out the third inner extension portion 243 by a predetermined length in the front and rear direction. The second portion 249*b* can be defined by cutting out the third base portion 241 by a predetermined length in a lateral (left and right) direction of the third base portion 241. The third portion 249*c* can be defined by cutting out the third outer extension portion 245 by a predetermined length in the front and rear direction.

The first portion 249*a*, the second portion 249*b*, and the third portion 249*c* can be connected to one another, and the third portion 249*c* defines an opening toward the rear surface of the door plate 210 at a front end portion of the third outer extension portion 245.

The third slit 249 can be a narrow long hole having a length larger than a width.

The plurality of third slits 249 can be defined over the entire third choke 240 except for the third coupling portion 247 and the portion where the third coupling portion 247 and the third inner extension portion 243 are connected to each other.

The plurality of third slits 249 can be disposed to be spaced apart from one another by predetermined distances in the direction in which the third choke 240 extends in the annular shape.

A space between the second and third chokes 230 and 240 and the front plate 111 can be partitioned by a choke cover 250. A space between the third choke 240 and the side plate 113 can also be partitioned by the choke cover 250.

Referring to FIG. 3, the choke cover 250 can be provided in an annular shape along the direction in which the second choke 230 and the third choke 240 extend in the annular shape.

A part of the choke cover 250 can be disposed between the second and third chokes 230 and 240 and the front plate 111, and the rest of the choke cover 250 can be disposed between the third choke 240 and the side plate 113.

A part of the choke cover 250 can be configured to overlap the front plate 111 in the front and rear direction, and the rest of the choke cover 250 can be configured to overlap the side plate 113 in a direction intersecting with the front and rear direction.

The choke cover 250 can define a plurality of choke rooms together with the second and third chokes 230 and 240.

The choke cover 250 can be provided with a heat-resistant material in order to suppress heat inside the cavity 120 from being discharged to the outside of the cavity 120. In some implementations, the choke cover 250 can be provided with heat-resistant plastic and/or heat-resistant rubber.

Figure 7:
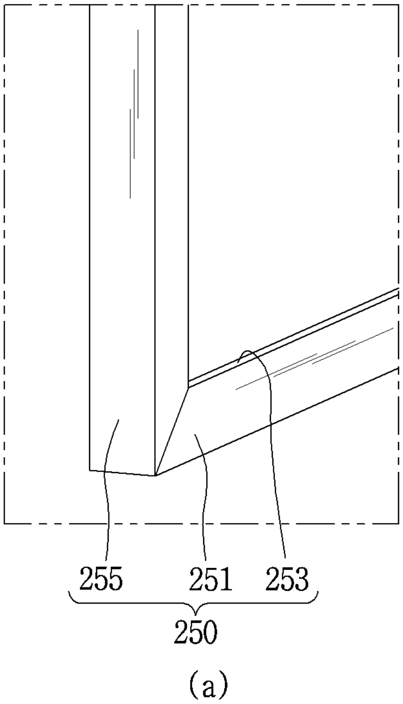
FIGS. 7A and 7B are enlarged views illustrating an example of a choke cover.
Figure 7:
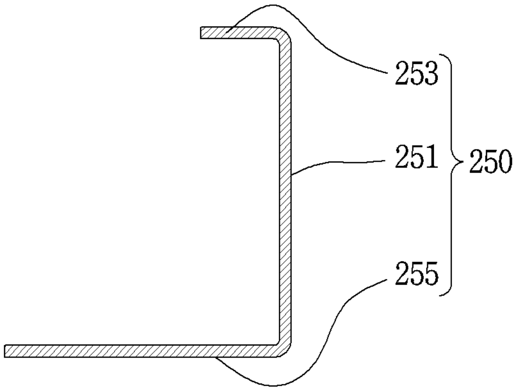

FIGS. 7A and 7B are a partial perspective view and a cross-sectional view of the choke cover 250 in an enlarged manner.

FIG. 7A is an enlarged view illustrating a region D of the choke cover 250 of FIG. 3, and FIG. 7B is a cross-sectional view illustrating the choke cover 250 illustrated in FIG. 7A, taken along the line D-D.

A structure in which the choke cover 250 covers the second and third chokes 230 and 240 is shown in FIG. 9.

As illustrated in FIGS. 7A, 7B, and 9, the choke cover 250 can include a cover base portion 251 having a predetermined width in a direction intersecting with the front and rear direction, and disposed between the second choke 230 and the front plate 111 with its rear surface facing the front plate 111.

The cover base portion 251 can be disposed outside the first choke 220 and provided in an annular shape along the circumference of the first choke 220.

The cover base portion 251 can overlap the front plate 111 in the front and rear direction, and face the front plate 111 when the door and the outer frame 110 are coupled to each other.

In some implementations, the shortest distance between the cover base portion 251 and the front plate 111 can be equal to the shortest distance between the first base portion 221 and the front plate 111.

In some implementations, the shortest distance between a front surface of the cover base portion 251 and the rear surface of the door plate 210 can be equal to the shortest distance between a front surface of the first base portion and the rear surface of the door plate 210.

In a direction intersecting with the front and rear direction, the sum of the width of the cover base portion 251 and the width of the first base portion 221 can be greater than the width of the front plate 111.

In some implementations, when the door and the outer frame 110 are coupled to each other, the cover base portion 251 can be brought into contact with the front plate 111.

In addition, the choke cover 250 can include a cover inner extension portion 253 extending in a direction from an inner circumference of the cover base portion 251 to be away from the front plate 111, and a cover outer extension portion 255 extending in the direction from an outer circumference of the cover base portion 251 to be away from the front plate 111.

The cover inner extension portion 253 can be an annular plate extending forward from the inner circumference of the cover base portion 251 by a predetermined length, and the cover outer extension portion 255 can be an annular plate extending forward from the outer circumference of the cover base portion 251 by a predetermined length.

The cover base portion 251 can be connected to the cover inner extension portion 253 and the cover outer extension portion 255 at predetermined angles.

The inner circumference of the cover base portion 251 and a rear end portion of the cover inner extension portion 253 can be connected to each other at a predetermined angle, and the outer circumference of the cover base portion 251 and a rear end portion of the cover outer extension portion 255 can be connected to each other at a predetermined angle. In some implementations, the cover base portion 251 can be perpendicularly connected to the cover inner extension portion 253 and the cover outer extension portion 255.

In some implementations, a portion at which the cover inner and outer extension portions 253 and 255 and the cover base portion 251 are connected to each other can be provided in a curved shape.

The first extension portion 223 and the second inner extension portion 233 can be partitioned from each other by the cover inner extension portion 253.

The cover inner extension portion 253 can come in contact with the first extension portion 223 and can be disposed to be spaced apart from the second inner extension portion 233 by a predetermined distance.

In some implementations, a length of the cover inner extension portion 253 in the front and rear direction can be equal to or shorter than a length of the first extension portion 223.

The cover outer extension portion 255 can be disposed between the side plate 113 and the third outer extension portion 245.

A length of the cover outer extension portion 255 in the front and rear direction can be longer than a length of the cover inner extension portion 253 in the front and rear direction. In addition, the length of the cover outer extension portion 255 in the front and rear direction can be longer than the lengths of the second and third outer extension portions 235 and 245.

In some implementations, a front end portion of the cover outer extension portion 255 can come in contact with the rear surface of the door plate 210.

In some implementations, the cover outer extension portion 255 can come in contact with the third outer extension portion 245.

In some implementations, when the door and the outer frame 110 are coupled to each other, the cover outer extension portion 255 can be in contact with the side plate 113.

As illustrated in FIGS. 3 and 4, an inner glass 260 can be provided inside the first choke 220.

In some implementations, the inner glass 260 can be a rectangular plate that is in contact with the inner circumference of the first choke 220. However, the present disclosure is not limited thereto, and the shape of the inner glass 260 can vary to correspond to the shape of the first choke 220.

A plurality of inner glass coupling holes 261 that are spaced apart from one another can be formed through an outer circumference of the inner glass 260.

The plurality of inner glass coupling holes 261 can be located to correspond to the plurality of protrusion coupling grooves 211*a* formed at the protrusion 211. Specifically, the plurality of inner glass coupling holes 261 can be located to correspond to the protrusion coupling grooves 211*a* that are adjacent to the inner circumference of the protrusion 211 among the plurality of protrusion coupling grooves 211*a*.

In a state in which the plurality of inner glass coupling holes 261 and the plurality of protrusion coupling grooves 211*a* are aligned to communicate with each other, a plurality of fourth coupling members can be inserted through the plurality of inner glass coupling holes 261 to be coupled to the plurality of protrusion coupling grooves 211*a*.

For example, the inner glass 260 can be fixed to the protrusion 211 by coupling force between the plurality of fourth coupling members and the plurality of protrusion coupling grooves 211*a*.

In some implementations, the plurality of first coupling members can be provided in the form of coupling screws or rivets.

The inner glass 260 can be provided transparently so that the user can visually check food accommodated in the cavity 120.

Also, a portion of the door plate 210 that is disposed inside the protrusion 211 and overlaps the inner glass 260 in the front and rear direction can be provided transparently.

Accordingly, the user can check the food inside the cavity 120 through the door plate 210 and the inner glass 260.

Figure 8:
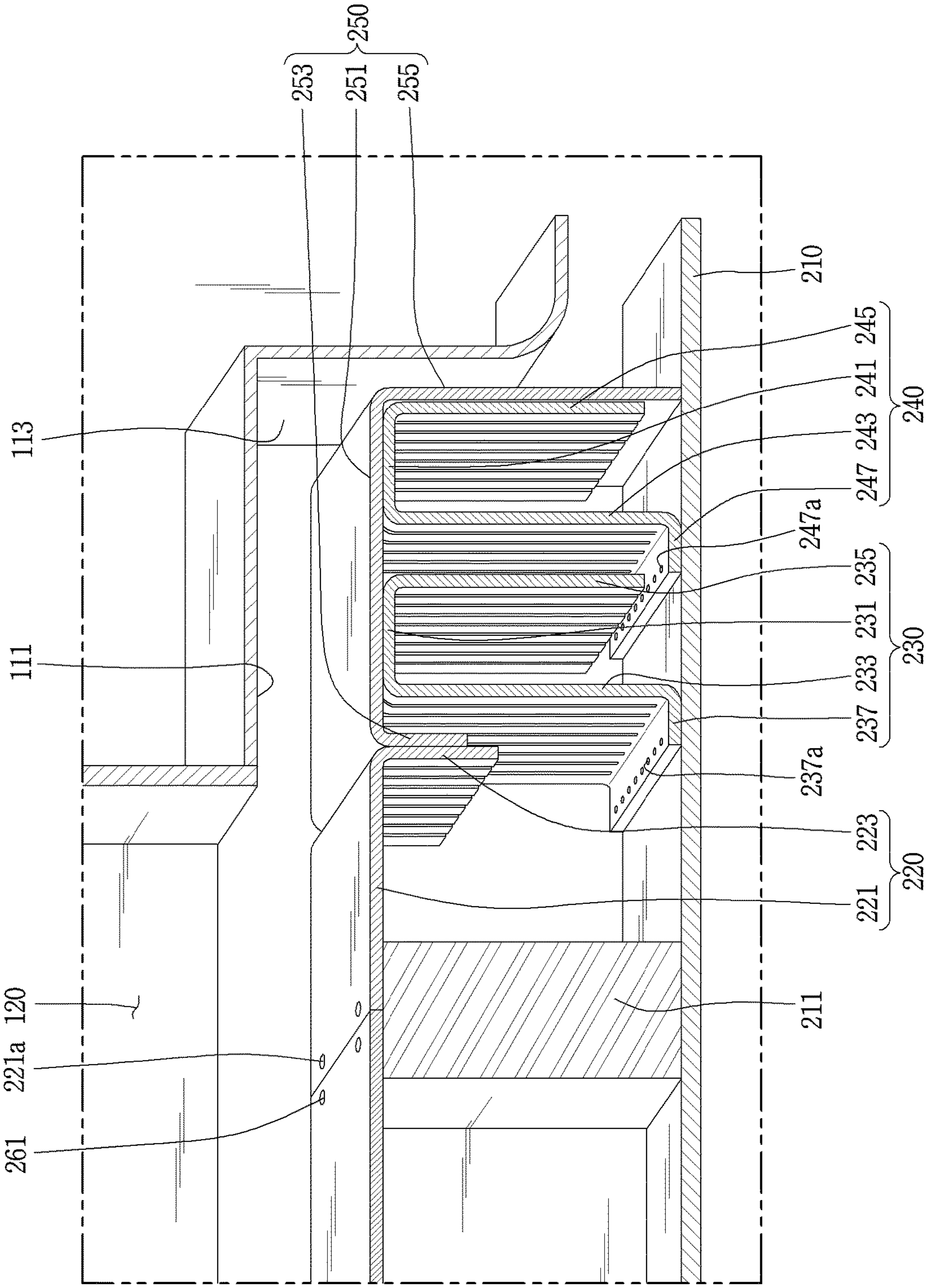
FIG. 8 is a partial perspective view illustrating an exemplary door part.

Referring to FIGS. 8 to 9, a partial perspective view of a part of the door part 200 is illustrated.

FIG. 8 is a partial perspective view illustrating the door part 200 shown in FIG. 1, taken along the line Viii-Viii. FIG. 8 illustrates a state in which the door part 200 is spaced apart from the front plate 111, and FIG. 9 illustrates a state in which the door part 200 illustrated in FIG. 8 is coupled to the front plate 111.

A first choke room V1 can be defined by the first choke 220, the door plate 210, the protrusion 211, the choke cover 250, and the second choke 230.

The first extension portion 223 in which the first slits 225 are defined at the first choke 220 can come into contact with the cover inner extension portion 253 of the choke cover 250. Any slot cannot be formed in the first base portion 221 of the first choke 220 which is exposed to the cavity 120.

Accordingly, the first choke room V1 can be partitioned (isolated) from the outside of the door part 200 and the cavity 120.

A second choke room V2 can be defined by the second choke 230, the door plate 210, the choke cover 250, and the third choke 240.

In addition, a third choke room V3 can be defined by the third choke 240, the door plate 210, and the choke cover 250.

The second and third choke rooms V2 and V3 can be partitioned (isolated) from the outside of the door part 200 and the cavity 120 by the choke cover 250.

The first choke 220, the second choke 230, and the third choke 240 can have cross sections which are different in length. Accordingly, the cross section can effectively suppress leakage of frequencies in different bands.

For example, the sum of the lengths of the first base portion 221 and the first extension portion 223 of the first choke 220 can be different from the sum of the lengths of the second base portion 231, the second inner extension portion 233, and the second outer extension portion 235 of the second choke 230.

In general, a shielding frequency for shielding electromagnetic waves can be decided based on Equation 1 below.

$$f = 1/(2\times\pi\times\sqrt{(L\times C)} \quad \text{Equation 1}$$

Here, f denotes a frequency of a shielded band, L denotes an inductance component, and C denotes a capacitor component.

That is, the frequencies of the bands shielded by the first choke 220, the second choke 230, and the third choke 240 provided in the door part 200 can depend on the inductance component L and the capacitor component C.

The inductance L can be variously designed according to the curved shapes, the lengths, and the shapes of slits of the first choke 220, the second choke 230, and the third choke 240. Since the design of the inductance component L is well known, a description thereof will be omitted.

The capacitor C can be designed in various ways depending on opposing areas of members constituting the first choke 220, the second choke 230, and the third choke 240. Since the design of the capacitor component C is well known, a description thereof will be omitted.

In order to efficiently heat food under a wider temperature condition, the oven 10 can be configured to irradiate frequencies of various bands into the cavity 120.

By defining a choke room, a shielding performance of a frequency of a specific band can be improved. Therefore, a plurality of choke rooms having different shielding frequencies can be provided in order to improve the shielding performance of the frequencies of various bands.

However, when all of the plurality of choke rooms overlap the front plate 111 in the front and rear direction, the width of the front plate 111 can increase, thereby reducing the capacity of the cavity 120.

In some implementations, the second and third choke rooms V2 and V3 can overlap the front plate 111 in the front and rear direction, but the first choke room V1 can be defined such that a part overlaps the front plate 111 in the front and rear direction and the rest overlaps the cavity 120 in the front and rear direction.

By defining the plurality of choke rooms, leakage of frequencies of multiple bands can be suppressed and simultaneously the width of the front plate 111 can be reduced so as to secure the capacity of the cavity 120.

Figure 10:
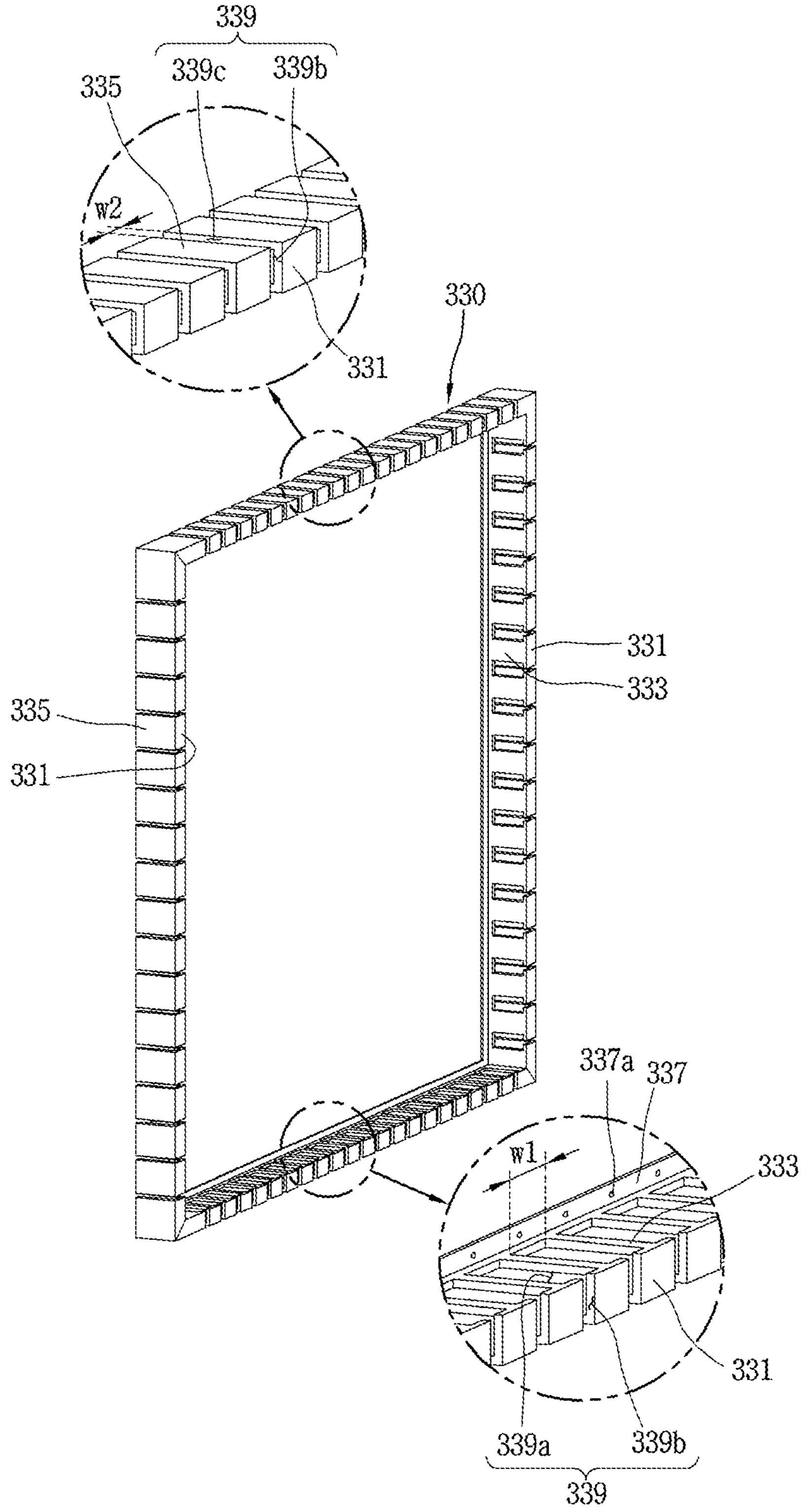
FIG. 10 is a perspective view illustrating another implementation of the second choke.

Referring to FIG. 10, another implementation of the second choke 230 disclosed in FIGS. 3 and 5 is illustrated.

Compared with the second choke 230 described with respect to FIGS. 3 and 5, a second choke 330 depicted in FIG. 10 has the following differences.

The second choke 330 can be provided with a plurality of second slits 339 that are spaced apart from one another in a direction in which the second choke 330 extends in an annular shape.

The second slits 339 can have predetermined widths in a direction in which the second choke 330 extends in the annular shape.

Each of the second slits 339 can include a first portion 339*a* defined in a second inner extension portion 333, a second portion 339*b* defined in a second base portion 331, and a third portion 339*c* defined in a second outer extension portion 335.

The first portion 339*a* can be defined by cutting out the second inner extension portion 333 by a predetermined length in the front and rear direction. The second portion 339*b* can be defined by cutting out the second base portion 331 by a predetermined length in a lateral (left and right) direction of the second base portion 331. The third portion 339*c* can be defined by cutting out the second outer extension portion 335 by a predetermined length in the front and rear direction.

The first portion 339*a*, the second portion 339*b*, and the third portion 339*c* can be connected to one another, and the third portion 339*c* include an opening toward the rear surface of the door plate 210 at a front end portion of the second outer extension portion 335.

The plurality of second slits 339 defined in the second choke 330 can have non-uniform widths in the direction in which the second choke 330 is provided in an annular shape.

With regard to each of the second slits 339, a portion formed in the second inner extension portion 333 and a portion formed in the second outer extension portion 335 can have different widths from each other.

In some implementations, a width W1 of the portion of the second slit 339 defined in the second inner extension portion 333 can be longer than a width W2 of the portion of the second slit 339 defined in the second outer extension portion 335. For example, a width of the first portion 339*a* can be longer than a width of the third portion 339*c*.

Alternatively, the width of the portion of the second slit which is defined in the second inner extension portion can be shorter than the width of the portion which is defined in the second outer extension portion.

In some implementations, a shape of a third slit defined in a third choke 340 can be similar to the shape of the second slit 339 defined in the second choke 330.

For example, with regard to each of the third slits, a portion formed in a third inner extension portion and a portion formed in a third outer extension portion can have different widths from each other.

A width of the portion of the third slit defined in the third inner extension portion 343 can be longer than a width of the portion of the third slit defined in the third outer extension portion. For example, a width of a first portion of the third slit can be longer than a width of a third portion of the third slit.

By virtue of such variable patterns of the slits, the thickness of the choke can be reduced while maintaining the inductance components of the second choke 330 and third choke (e.g., third choke 240 in FIG. 3). This can result in reducing the distance between the door plate 210 and the front plate 111 when the door part 200 and the outer frame 110 are coupled to each other.

That is, while maintaining the shielding performance of the chokes, the thicknesses of the second choke 330 and third choke can be reduced, thereby reducing the size of the door.

Except for the aforementioned configurations, the structure and function of the door part including the second choke 330 in FIG. 10 are similar to the structure and function of the door part 200 described with reference to FIG. 3, so the configuration of the door part of FIG. 10 will be understood with reference to FIG. 3.

Although described above with reference to the preferred implementations of the present disclosure, it will be understood that various changes and modifications can be made by those skilled in the art within the scope of the claims.

What is claimed is:

1. An oven comprising:

a body part defining an inner space that has an opening in one direction; and a door part mounted on a front surface of the body part and configured to open and close the opening, wherein the door part comprises:

a door plate disposed toward an outside of the body part, a protrusion protruding from a central portion of the door plate toward the inner space and provided in a closed loop shape, an inner glass coupled to a first region of the protrusion and covering the opening, a first choke provided in a closed loop shape and coupled to a second region of the protrusion to surround the inner glass, a second choke having a closed loop shape and a size greater than a size of the first choke, spaced apart at a predetermined interval along an outer circumference of the first choke, and coupled to the door plate, a third choke having a closed loop shape and a size greater than a size of the second choke, spaced apart at a predetermined interval along an outer circumference of the second choke, and coupled to the door plate, and a choke cover configured to cover at least one surface of the second choke and the third choke, wherein the body part comprises:

a front plate recessed in the front surface of the body part and surrounding the opening, and a side plate extending from an outer circumference of the front plate and protruding in the one direction, wherein the first choke is arranged to overlap the opening in the one direction, and wherein the second choke, the third choke, and the choke cover are (i) accommodated in a space between the front plate and the side plate and (ii) arranged to overlap the front plate in the one direction.

2. The oven of claim 1, wherein a shortest distance between the first choke and the front plate is shorter than a shortest distance between the second choke and the front plate.

3. The oven of claim 1, wherein the first choke comprises:

a first base portion having a predetermined width in a direction intersecting with the one direction and extending in a closed loop shape along the circumference of the protrusion; and a first extension portion extending in the one direction from an outer circumference of the first base portion to be spaced apart from the front plate, and wherein the first base portion includes an inner portion facing the inner space and an outer portion facing the front plate.

4. The oven of claim 3, wherein the first extension portion is provided with a plurality of first slits extending in the one direction by a predetermined length, wherein each of the plurality of first slits defines an opening toward the door plate, and wherein each of the plurality of first slits is disposed to be spaced apart from another first slit of the plurality of first slits along the outer circumference of the first base portion.

5. The oven of claim 3, wherein the inner portion of the first base portion is coupled to a surface of the protrusion facing the inner space.

6. The oven of claim 3, wherein the choke cover is disposed outside the first choke, provided in a closed loop shape along the circumference of the first choke, and configured to overlap with the front plate in the one direction, and wherein the choke cover is configured to partition the second choke and the front plate from each other.

7. The oven of claim 6, wherein the choke cover comprises:

a cover base portion having a predetermined width in a direction intersecting with the one direction, having a surface facing the front plate, and disposed between the second choke and the front plate;

a cover inner extension portion extending in the one direction from an inner circumference of the cover base portion to be spaced apart from the front plate and disposed between the first extension portion and the second choke; and a cover outer extension portion extending in the one direction from an outer circumference of the cover base portion to be spaced apart from the front plate and disposed outside the second choke.

8. The oven of claim 7, wherein the cover inner extension portion extends to be shorter than the first extension portion.

9. The oven of claim 7, wherein the cover inner extension portion is configured such that a portion thereof facing the first extension portion contacts the first extension portion.

10. The oven of claim 7, wherein the cover outer extension portion is configured such that a portion thereof facing the second choke contacts the second choke.

11. The oven of claim 7, wherein the cover outer extension portion is configured such that an end portion thereof contacts the door plate.

12. The oven of claim 1, wherein the second choke comprises:

a second base portion extending in a closed loop shape along the circumference of the first choke, a second inner extension portion protruding from an inner circumference of the second base portion in a first direction, and a second outer extension portion protruding in the first direction from an outer circumference of the second base portion, and wherein the second outer extension portion is disposed such that an end portion thereof is spaced apart from the door plate by a predetermined distance.

13. The oven of claim 1, wherein the third choke comprises:

a third base portion having a predetermined width in a direction intersecting with the one direction and extending in a closed loop shape along the circumference of the second choke;

a third inner extension portion extending in the one direction from an inner circumference of the third base portion to be spaced apart from the front plate; and a third outer extension portion extending in the one direction from an outer circumference of the third base portion to be spaced apart from the front plate.

14. The oven of claim 13, wherein the third outer extension portion is disposed such that an end portion thereof is spaced apart from the door plate by a predetermined distance.

15. The oven of claim 13, wherein the third inner extension portion is provided with a third coupling portion, the third coupling portion extending from an end portion thereof and configured to bend toward the protrusion, wherein the third coupling portion is provided with a plurality of third coupling holes defined through an inner circumference thereof, wherein the door plate is provided with a plurality of second door plate coupling grooves recessed in a portion thereof facing the plurality of third coupling holes, and wherein a plurality of third coupling members is coupled to the plurality of second door plate coupling grooves through the plurality of third coupling holes.

16. The oven of claim 1, wherein the first choke includes (i) an inner portion facing the inner space and (ii) an outer portion facing the front plate, wherein the second choke comprises:

a second base portion extending in a closed loop shape along the circumference of the first choke, a second inner extension portion protruding from an inner circumference of the second base portion in a first direction, a second outer extension portion protruding in the first direction from an outer circumference of the second base portion, and a plurality of second slits spaced apart from each other in an extension direction of the second base portion, wherein each of the plurality of second slits comprises:

a first portion extending in the first direction at the second inner extension portion, a second portion extending in a second direction intersecting the first direction at the second base portion, and a third portion extending in the first direction at the second outer extension portion, and wherein a width of the first portion is greater than a width of the third portion.

* * * * *